United States Patent Office 3,448,721
Patented June 10, 1969

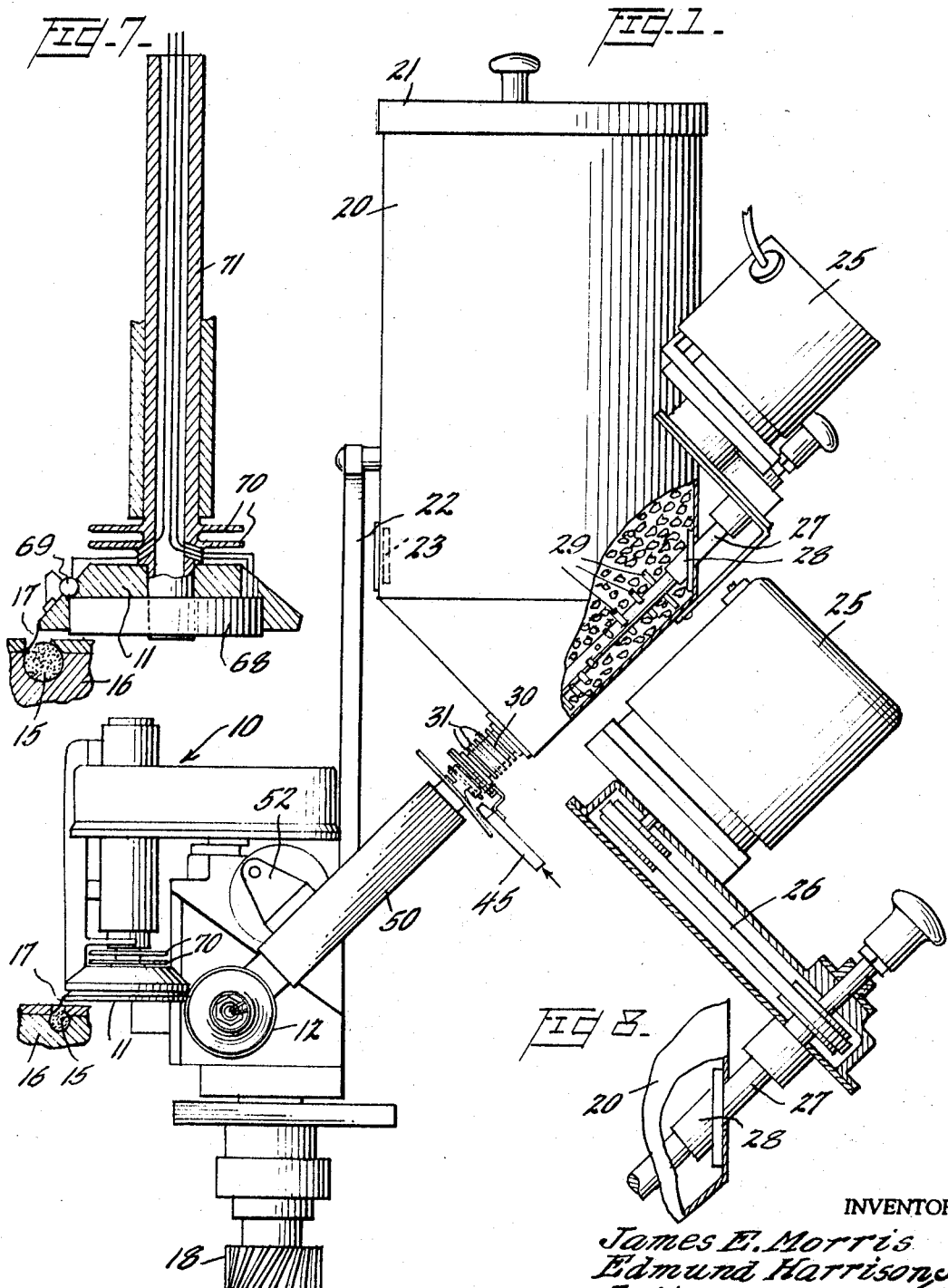

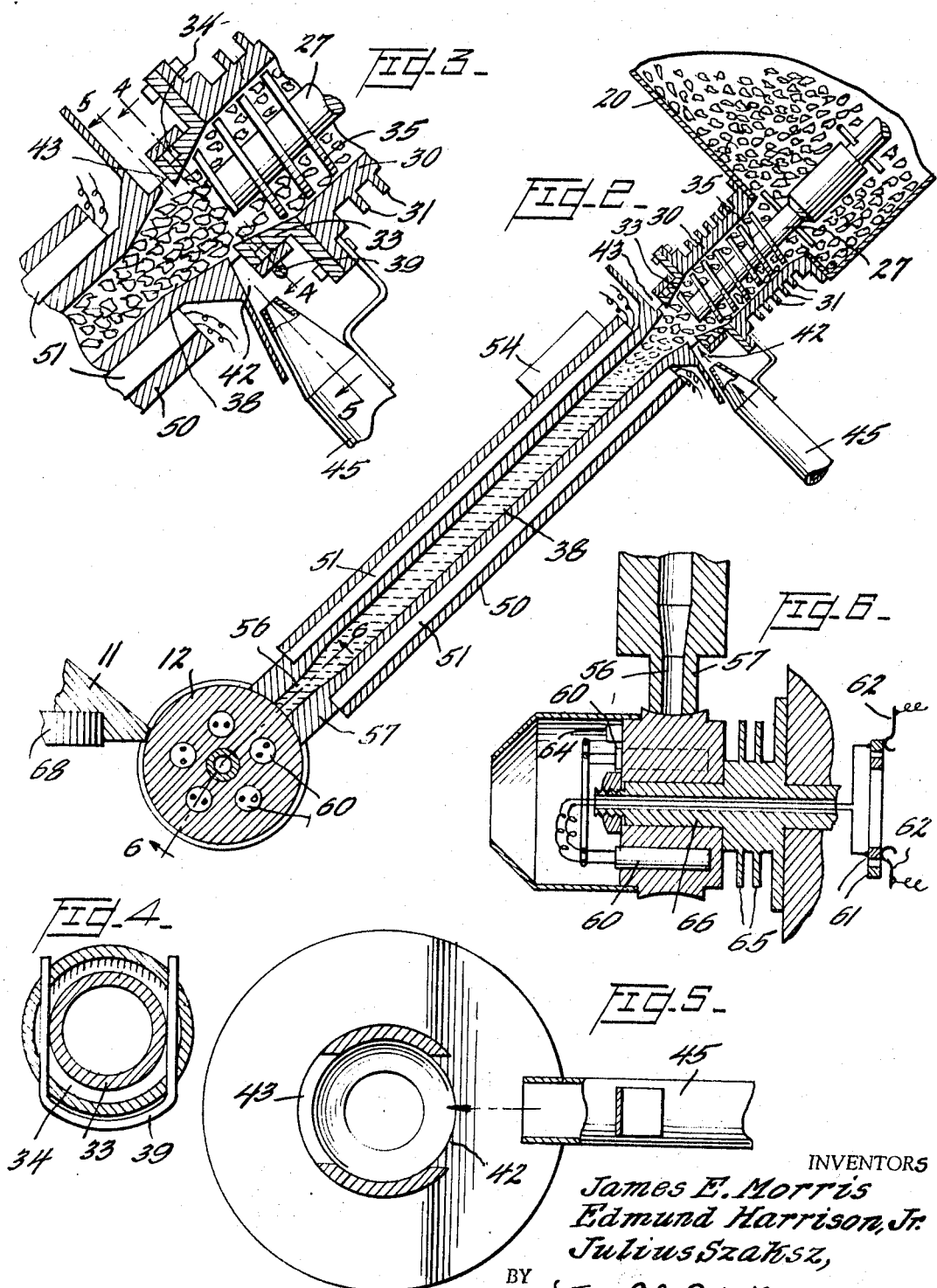

3,448,721
APPARATUS FOR SEALING CIGARETTE WRAPPERS ON CONTINUOUS ROD MACHINES
James Ernest Morris, Edmund Harrison, Jr., and Julius Szaksz, Richmond, Va., assignors to The Molins Organisation, Limited, London, England, a corporation of Great Britain
Filed Sept. 28, 1967, Ser. No. 671,402
Int. Cl. B05c 1/14
U.S. Cl. 118—202      3 Claims

ABSTRACT OF THE DISCLOSURE

Apparatus for applying a thermoplastic adhesive to a continuous rod wrapper, comprising a supply hopper for solid adhesive in granular form, a conveyor for moving the granular material out of the hopper and toward and into a heated passage beyond the conveyor, in which passage the material is melted, heated adhesive applying rolls receiving the molten material directly from the heated passage and supplying the same as a thin narrow strip to an edge portion of the wrapper, and devices for cooling the granular material as it moves from the conveyor to the heated passage to prevent melting of the material on the conveyor.

---

In the production of cigarettes on continuous rod machines, the tobacco filler is enclosed in a continuous wrapper which is folded around the filler by stationary guides while the wrapper (with the filler thereon) is being fed rapidly in the direction of its length. The rod is sealed by applying adhesive to one edge portion of the wrapper before it is folded down on the other edge portion. The adhesives most commonly used have been water solutions of starch or casein, which necessitate the passing of the rod through a heater to dry the adhesive.

Frequent improvement in various components of these machines have permitted machine operation at increasingly higher speeds and with greater efficiency. A modern rod speeds in excess of 450 ft. per minute, corresponding to an output of the order of 2,000 cigarettes of (70 millimeter length) per minute, the sealing of the cigarette wrapper in the manner practiced for many years has become a limiting factor and must be greatly improved if still higher speeds and increased efficiency are to be achieved.

Although thermoplastic or "hot melt" adhesives are widely used in other fields, their use in the sealing of wrappers to form continuous cigarette rods, or rods containing cigarette filter elements, has not been commercially adopted because the high speed of the rod and the requirement of an air-tight seal over the entire length of rod with a wrapper overlap of less than ⅛ inch give rise to problems which have not been solved by apparatus of earlier design.

It has been found that thermoplastic adhesives deteriorate and lose their effectiveness when heated for long periods, for instance in a supply vessel or melting pot. Furthermore, such adhesives are poor conductors of heat, and if the adhesive in a supply vessel or melting pot is allowed to cool while the machine in which the adhesive is used is idle, remelting of the solidified adhesive is difficult. In order to overcome these and other problems it is proposed to use in the practice of the instant invention a thermoplastic adhesive in particulate or granular form, feeding it in the quantity required to a heated passage of limited volume in which the granules are melted, and supplying the molten adhesive from the heated passage directly to heated rolls which apply the adhesive to the edge portion of the rapidly moving wrapper. It is a feature of the invention that melting of the granules as they are fed toward and into the heating zone is prevented, preferably by flowing cooling air through the granules, thereby avoiding contact of sticky or molten adhesive with the conveyor employed to feed the granules in the required quantity. Solidification and caking of adhesive on the conveyor and the removal problem which this presents are thus eliminated.

Further objects and features of the invention will be apparent from the following description taken in connection with the accompanying drawings, in which:

FIGURE 1 is a view in elevation of adhesive applying apparatus embodying the principles of the invention;

FIGURE 2 is a vertical sectional view of a portion of the structure shown in FIGURE 1;

FIGURE 3 is a view on an enlarged scale of a portion of the structure shown in FIGURE 2;

FIGURES 4 and 5 are transverse sectional views taken substantially on the line 4—4 and 5—5 respectively of FIGURE 3;

FIGURE 6 is a fragmentary sectional view on the line 6—6 of FIGURE 2;

FIGURE 7 is a vertical sectional view of the adhesive applying wheel and associated structure; and FIGURE 8 is a view partly in section of the driving means for the granule feeding means.

To facilitate an understanding of the principles of the invention, a simplified embodiment thereof is represented in the drawings and described in detail hereinafter. It will be understood, however, that the invention is not thereby limited, but that such alterations and modifications as may be expected of those skilled in the art are contemplated hereby and intended to be embraced herein.

The instant invention is illustrated as applied to a conventional adhesive supplying unit indicated generally at 10 in FIGURE 1 of the drawings, which unit has been used extensively in this country for many years. The unit includes an adhesive applying wheel or disk 11, supplied from a roller, sometimes called a "furnish" or "marble" roller, indicated at 12, having a slightly concave periphery as illustrated more particularly in FIGURE 6. The adhesive applying wheel 11 engages the periphery of the furnish roller 12, removes adhesive from the latter, and applies the adhesive to the upstanding edge 17 of the wrapper as the wrapper and the entrained partly wrapped tobacco particles 15 are being moved endwise through a stationary guide 16. The guide 16 is part of what is commonly called in the art a garniture, which is shaped to fold the wrapper around the tobacco and, after application of adhesive to the upstanding edge portion 17 of the wrapper, to fold the latter down on the opposite edge portion of the wrapper and thus to seal the rod. The adhesive applying wheel 11 and the furnish roller 12 are driven from the cigarette machine proper, for instance through the spiral gear 18 which meshes with a spiral gear driven at machine speed. The adhesive supplying wheel 11 usually rotates at a speed such that its periphery moves slightly faster than the rod, and the furnish roller 12 is rotated at a speed sufficient to afford an adequate supply of adhesive of the desired thickness to the wheel 11. The structure just described is essentially that illustrated as early as 1933 in the U.S. patent to Walter E. Molins, 1,899,628, granted Feb. 28, 1933.

The improvement which is now proposed, and which may reasonably be expected to accommodate an increase in the speed of cigarette making machines of the order of 100%, i.e., from 2,000 to 4,000 cigarettes per minute, will eliminate the need of a heater for drying the starch or casein adhesive heretofore used. It will be appreciated that the improvement may be applied in the same manner to the sealing of wrappers employed in the production of a continuous filter rod, which is formed in much the same way as is the continuous cigarette rod, the wrapper serving to enclose filter elements rather than tobacco.

A hopper or supply bin 20 having a removable cover 21 is supported on a bracket 22 from the conventional adhesive supplying unit, the hopper being of such size as to receive an adequate supply of thermoplastic or hot melt adhesive commercially available in granular form. A window 23 may be provided in the hopper, to enable the operator to determine when the supply of material should be replenished.

An electric motor 25, the speed of which is preferably controllable by regulating the electrical supply in known manner, serves to drive shaft 27 through belt 26, as shown in FIGURE 8. It will be appreciated that in lieu of regulating the speed of motor 25, conventional variable speed gearing may be interposed between the motor and the shaft 27, to the end that the required quantity of adhesive may be fed from supply hopper 20.

Shaft 27 is extended through the lower portion of supply hopper 20, is journaled in a bearing 28, and is provided within the hopper with a plurality of pins 29 which may be arranged in staggered relation, as shown in FIGURE 1, and which serve to agitate the granular material within the hopper to prevent the formation therein of voids or cavities to promote uniform flow of material from the hopper into and through a conduit 30. Formed on shaft 27 and located within conduit 30 is a worm thread constituting a conveyor 35 which serves to propel downwardly through conduit 30 the granules discharging from the lower portion of hopper 20, as shown in FIGURE 2 and in enlarged view FIGURE 3. The conduit 30 is provided with a plurality of circumferential ribs 31 which dissipate heat, so that the granules do not become sticky while in contact with conveyor 35.

At its lower end, conduit 30 communicates through discharge nozzle 33 with an elongated heated passage 38 of restricted volume in which the solid granules of adhesive are melted and from which the molten adhesive is fed directly to the furnish roller 12. The upper end of passage 38 may be removably connected to the nozzle 33 in the manner shown in FIGURE 4 by a clip 39 which seats in a circumferential groove 34 of the nozzle, so that the supply hopper 20 and conduit 30 may readily be disconnected from the heated passage 38 for cleaning and repair.

Passage 38 is provided near its upper end with an air inlet 42 and an air discharge outlet 43, both the inlet and the outlet being formed as slots extending partly around the circumference of the passage 38, the depth of each slot lengthwise of passage 38 being less than the diameter of the adhesive granules being fed, so as to preclude the discharger of granules through the slots. An air pipe 45 directs air under pressure through air inlet 42, the lower edge of which is inclined upwardly in the direction of air flow, so that cooling air may be caused to pass between the granules as they enter the heating passage 38, thus preventing melting or stickiness of the granules as they leave the conveyor 35. Caking or hardening of the the adhesive on the conveyor is thus effectively prevented.

An elongated sleeve 50 having therein a plurality of electrical heating elements 51 surrounds and supports the passage 38, and the latter is thereby maintained at a temperature sufficiently high to melt the granules as they flow downwardly through the passage 38. Sleeve 50 may be mounted on the conventional adhesive supplying unit by bracket 52. Preferably a thermostatic control 54 regulates the current supplied to the heating elements 51 so as to stabilize the temperature of the heated passage 38 within a desired range, thus insuring complete melting of the granules within the passage while preventing excessive temperature rise and resulting heating of the granules as they leave conveyor 35 and enter the upper end of the passage. The molten adhesive emerging at the lower end of passage 38 flows through a discharge opening 56 in a nozzle portion 57, the latter being shaped to conform in contour with the concave periphery of the furnish roller 12, as shown primarily in FIGURE 6.

In order to insure that no hardening of adhesive occurs either on the furnish roller 12 or on the adhesive applying wheel 11, both the roller and the wheel are heated. Thus as shown in FIGURES 2 and 6, furnish roller 12 is provided with a plurality of circumferentially spaced recesses in which are located heating elements 60 supplied with current from slip rings 61 and brushes 62, the current being preferably controlled to maintain a temperature of the roller 12 within desirable limits by a thermostat 64 in contact with the roller 12. Cooling fins 65 are formed on shaft 66 on which roller 12 is mounted in order to minimize transfer of heat to the shaft bearing.

Similarly, adhesive applying wheel 11 is provided, as shown in FIGURE 7, with a heating element 68, the current supply to the heater being controlled by a thermostat 69 associated with the wheel 11 to maintain the wheel within a desired temperature range, cooling fins 70 being provided on shaft 71 on which wheel 11 is mounted to minimize conduction of heat to the shaft bearing.

It will be appreciated that various conventional types of control to regulate the supply of material may be utilized. For example, signaling means may be applied to supply hopper 20 to indicate when the hopper should be replenished, or feeding devices may be provided to deliver additional adhesive to the hopper automatically as required. In general, however, it is preferable that the apparatus for supplying the adhesive be as simple as possible, consistent with the maintenance of a uniform supply of adhesive to the furnish wheel 12 and the prevention of melting of the granules until they have passed beyond the moving elements of the apparatus.

Having thus described the invention, what is claimed as new and desired to be secured by Letters Patent is:

1. In apparatus for applying a thermoplastic adhesive to a continuous rod wrapper, the combinaton with a supply hopper for solid adhesive in granular form, of a conveyor for moving the granular material out of the hopper, an elongated heated passage in which the granular material is melted, said passage communicating with the lower portion of said hopper and located beyond the discharge end of the conveyor, heated adhesive applying rolls receiving molten material directly from the heated passage and supplying the adhesive as a thin narrow strip to an edge portion of the wrapper, and means for passing cooling fluid through the granular material as it moves from the conveyor to the heated passage to prevent heating of the material while on the conveyor.

2. The combination recited in claim 1 in which the means for passing cooling fluid through said granular material includes at least one opening through the wall of the passage and an air moving means disposed to cause airflow through said opening.

3. The combination recited in claim 2 wherein the opening is a slot having a width less than the diameter of the granular material of the hopper.

References Cited

UNITED STATES PATENTS 3,181,501   5/1965   Dean _____ 118—410 XR

WALTER A. SCHEEL, *Primary Examiner.*

R. I. SMITH, *Assistant Examiner.*

U.S. Cl. X.R.

18—12